(12) United States Patent
Walter

(10) Patent No.: US 11,411,490 B2
(45) Date of Patent: Aug. 9, 2022

(54) CHARGE PUMPS WITH ACCURATE OUTPUT CURRENT LIMITING

(71) Applicant: ANALOG DEVICES INTERNATIONAL UNLIMITED COMPANY, Limerick (IE)

(72) Inventor: William L. Walter, Lowell, MA (US)

(73) Assignee: Analog Devices International Unlimited Company, Limerick (IE)

( * ) Notice: Subject to any disclaimer, the term of this patent is extended or adjusted under 35 U.S.C. 154(b) by 0 days.

(21) Appl. No.: 16/577,146

(22) Filed: Sep. 20, 2019

(65) Prior Publication Data

US 2020/0099291 A1    Mar. 26, 2020

Related U.S. Application Data

(60) Provisional application No. 62/736,826, filed on Sep. 26, 2018.

(51) Int. Cl.
*H02M 3/07*    (2006.01)

(52) U.S. Cl.
CPC .................... *H02M 3/07* (2013.01)

(58) Field of Classification Search
CPC ........... H02M 3/07; H02M 2001/0003; H02M 2003/071; H02M 2003/072; H02M 3/073; H02M 2003/075–078
See application file for complete search history.

(56) References Cited

U.S. PATENT DOCUMENTS

| 4,686,428 A | 8/1987 | Kuhnel et al. |
| 5,455,794 A | 10/1995 | Javanifard et al. |
| (Continued) | | |

FOREIGN PATENT DOCUMENTS

| JP | 2007-243274 A | 9/2007 |
| KR | 10-1390393 B1 | 4/2014 |

OTHER PUBLICATIONS

Bondade, R., "Switched-Capacitor Power Converter Design and Modeling in z-Domain" Chapter 7 of Reconfigurable Switched-Capacitor Power Converters, 2013 in 35 pages.

(Continued)

*Primary Examiner* — Patrick C Chen
(74) *Attorney, Agent, or Firm* — Knobbe, Martens, Olson & Bear, LLP

(57) ABSTRACT

Charge pumps with accurate output current limiting are provided herein. In certain embodiments, a charge pump includes an output terminal for providing a regulated output voltage, a switched capacitor, and switches that control connectivity of the switched capacitor to selectively charge or discharge the switched capacitor. The switches are operable in two or more phases including a charging phase in which the switched capacitor is charged with a charging current and a discharging phase in which the switched capacitor is coupled to the output terminal. The charge pump further includes an output current limiting circuit that controls the charging current to limit an amount of output current delivered by the charge pump to the output terminal. The output current limiting circuit limits the output current based on comparing a reference signal to an integral of an observation current that changes in relation to the charging current.

20 Claims, 7 Drawing Sheets

CHARGING PHASE

DISCHARGING PHASE

(56) References Cited

U.S. PATENT DOCUMENTS

| | | | |
|---|---|---|---|
| 5,553,030 A | 9/1996 | Tedrow et al. | |
| 5,777,465 A | 7/1998 | Walter | |
| 6,064,199 A | 5/2000 | Walter et al. | |
| 6,326,828 B1 | 12/2001 | Gaiser et al. | |
| 6,400,544 B1 | 6/2002 | Grimm et al. | |
| 6,411,531 B1* | 6/2002 | Nork | H02M 3/073 363/60 |
| 6,429,712 B1 | 8/2002 | Gaiser et al. | |
| 6,438,005 B1 | 8/2002 | Walter | |
| 6,445,623 B1 | 9/2002 | Zhang et al. | |
| 6,504,422 B1 | 1/2003 | Rader et al. | |
| 6,738,272 B2 | 5/2004 | Yamanaka et al. | |
| 6,873,203 B1 | 3/2005 | Latham, II et al. | |
| 7,023,260 B2 | 4/2006 | Thorp et al. | |
| 7,218,082 B2 | 5/2007 | Walter et al. | |
| 7,224,204 B2 | 5/2007 | Walter | |
| 7,298,198 B2 | 11/2007 | Stopel | |
| 7,439,716 B2 | 10/2008 | Gay | |
| 7,447,049 B2 | 11/2008 | Garner et al. | |
| 7,511,390 B1 | 3/2009 | Walter | |
| 7,570,109 B2 | 8/2009 | Xu et al. | |
| 8,279,631 B2 | 10/2012 | Yang | |
| 8,362,823 B2 | 1/2013 | Lin et al. | |
| 8,519,780 B1 | 8/2013 | Vilas Boas et al. | |
| 8,536,840 B2 | 9/2013 | Walter et al. | |
| 8,593,115 B2 | 11/2013 | Walter et al. | |
| 8,618,867 B2 | 12/2013 | Singnurkar | |
| 9,136,724 B2 | 9/2015 | Ye et al. | |
| 9,190,903 B2 | 11/2015 | Jenker et al. | |
| 9,389,625 B2 | 7/2016 | Hu et al. | |
| 9,941,790 B2 | 4/2018 | Dhanasekaran | |
| 10,114,392 B2 | 10/2018 | King et al. | |
| 2007/0013434 A1 | 1/2007 | Peschke | |
| 2009/0108677 A1 | 4/2009 | Walter et al. | |
| 2009/0128212 A1 | 5/2009 | Liu et al. | |
| 2011/0148510 A1* | 6/2011 | Dhuyvetter | H02M 3/07 327/536 |
| 2018/0120884 A1 | 5/2018 | King et al. | |
| 2018/0301999 A1* | 10/2018 | Moon | H02M 3/33523 |
| 2020/0014374 A1* | 1/2020 | Loke | H02M 3/07 |

OTHER PUBLICATIONS

Gregoire, B. Robert., "A Compact Switched-Capacitor Regulated Charge Pump Power Supply" IEEE Journal of Solid-State Circuits, vol. 41, No. 8 dated Aug. 2006, in 10 pages.

* cited by examiner

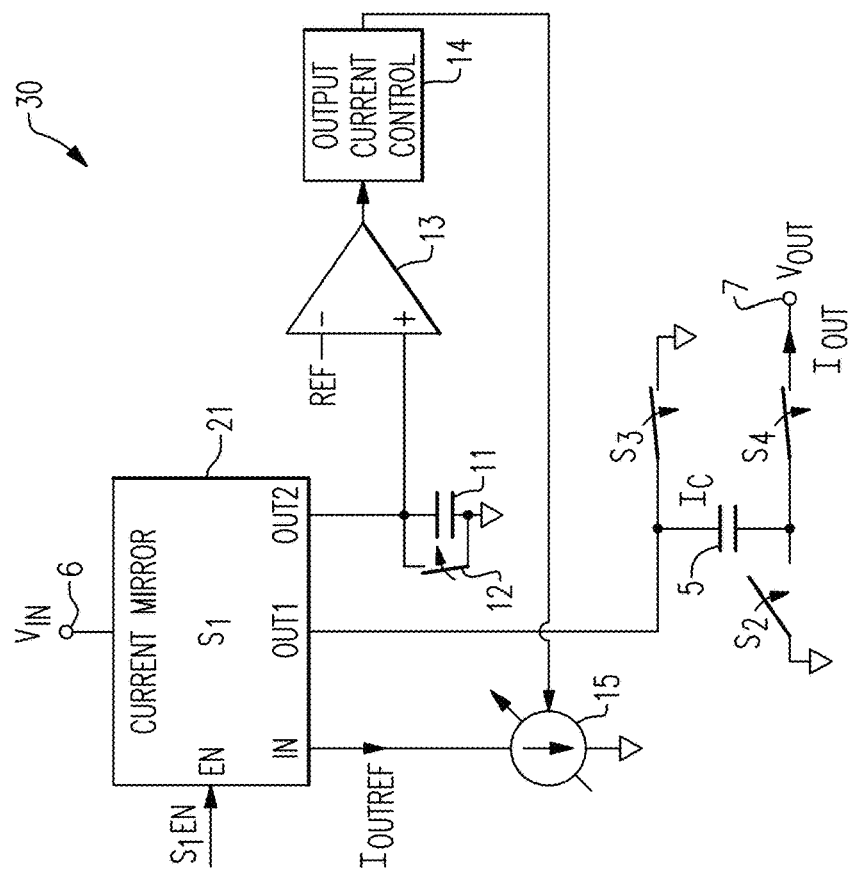
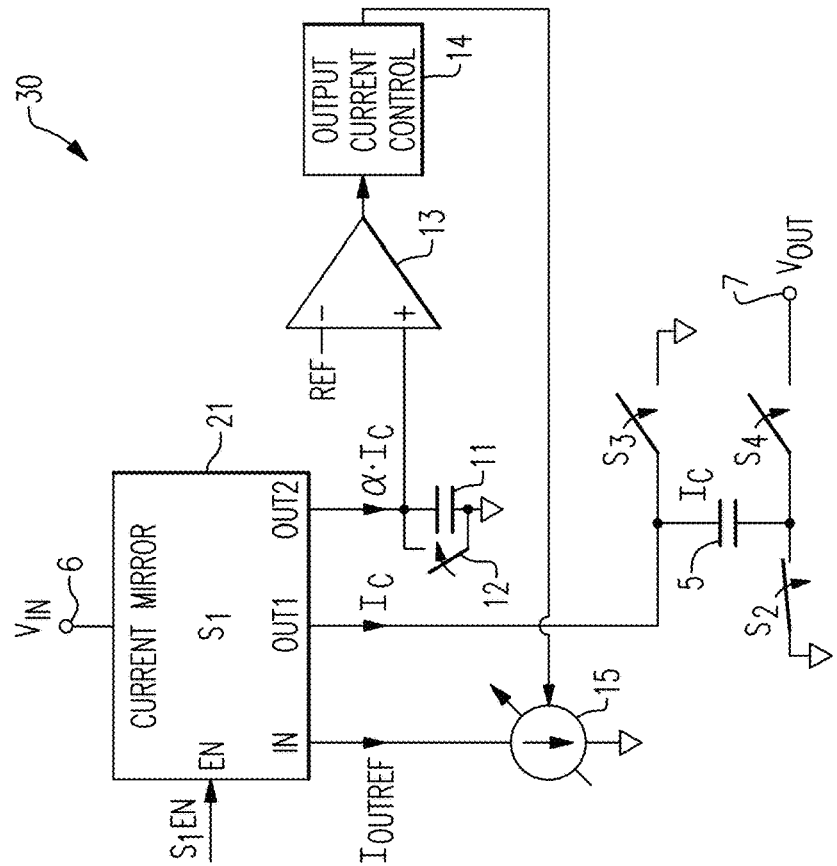

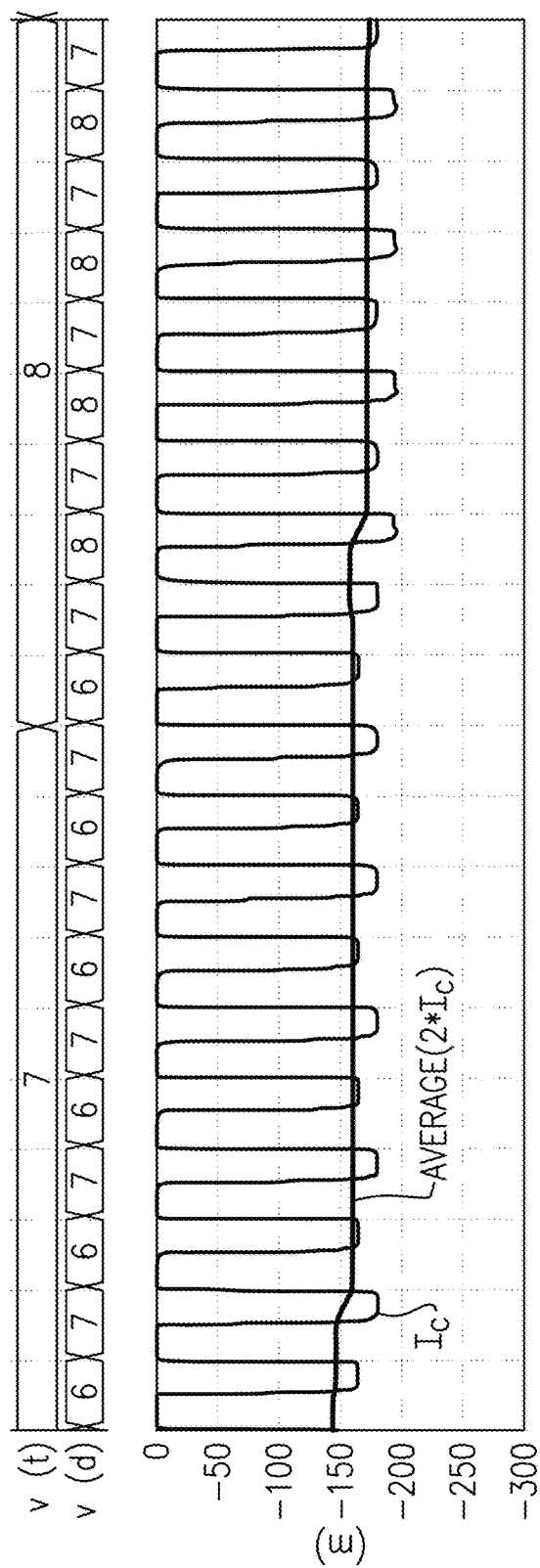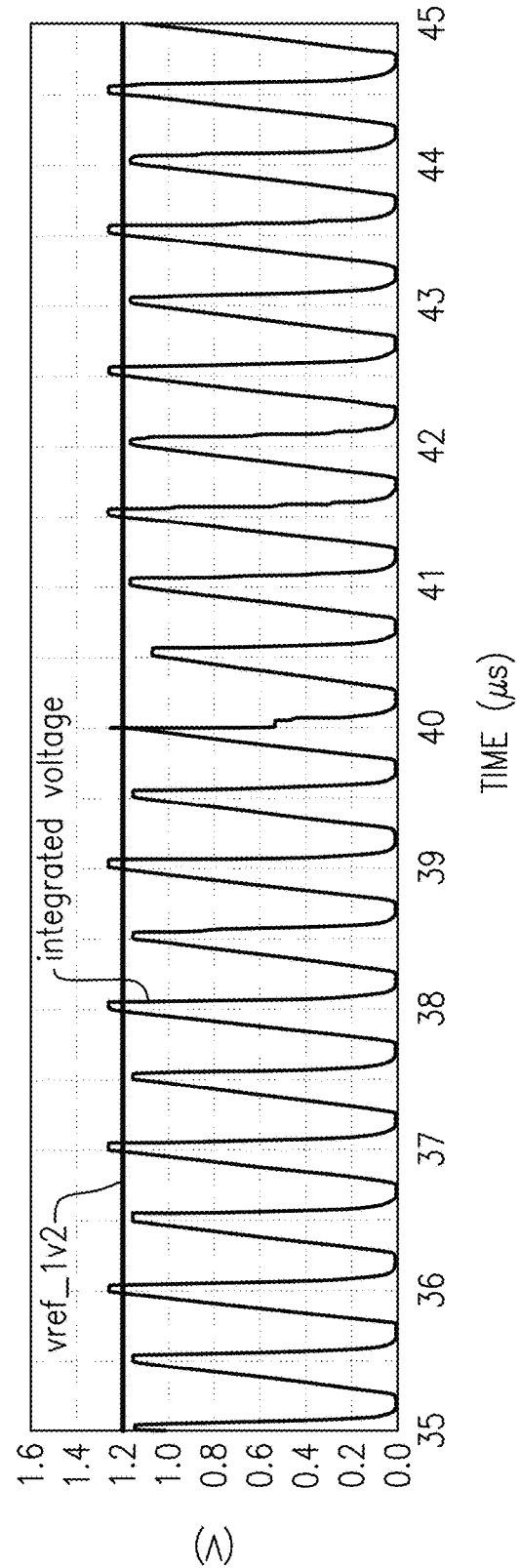
FIG.5B

CHARGE PUMPS WITH ACCURATE OUTPUT CURRENT LIMITING

CROSS-REFERENCE TO RELATED APPLICATIONS

The present application claims priority to U.S. Provisional Patent Application No. 62/736,826, filed Sep. 26, 2018, and titled "CHARGE PUMPS WITH ACCURATE OUTPUT CURRENT LIMITING," the entirety of which is hereby incorporated herein by reference.

FIELD OF THE DISCLOSURE

Embodiments of the invention relate to electronic systems, and more particularly, to charge pumps.

BACKGROUND

A voltage regulator serves to generate a substantially constant output voltage from a poorly-specified and/or fluctuating supply voltage or other input voltage source. Series regulators and switching regulators are two common types of voltage regulators. Low dropout (LDO) series regulators provide good regulation with very low noise, however, the current supply from the regulated output comes directly from the supply voltage. Thus, an LDO series regulator's efficiency is limited by the ratio of the output voltage to the supply voltage, and thus the efficiency of the LDO series regulator drops rapidly as the supply voltage increases relative to the output voltage.

Switching regulators are generally more efficient than series regulators. A switching regulator employs one or more switches (for instance, power transistors) coupled in series and/or parallel with an output terminal that provides an output voltage to a load. Additionally, a control circuit (for instance, an oscillator) turns the switches ON and OFF to control delivery of current pulses to the output terminal. One or more energy storage elements, such as inductor(s) and/or capacitor(s), can be used to convert the switched current pulses into a steady load current. Because inductors suitable for voltage regulation tend to be large components, switched capacitor converters are preferred in miniaturized devices, for instance, applications in which it is desired to fully integrate a switching regulator on a semiconductor die.

SUMMARY OF THE DISCLOSURE

Charge pumps with accurate output current limiting are provided herein. In certain embodiments, a charge pump includes an output terminal for providing a regulated output voltage, a switched capacitor, and switches that control connectivity of the switched capacitor to selectively charge or discharge the switched capacitor. The switches are operable in two or more phases including a charging phase in which the switched capacitor is charged with a charging current and a discharging phase in which the switched capacitor is coupled to the output terminal. The charge pump further includes an output current limiting circuit that limits an amount of output current delivered by the charge pump to the output terminal during the discharging phase. The output current limiting circuit limits the output current based on comparing a reference signal to an integral of an observation current that changes in relation to the charging current. For instance, when the charge provided to the switched capacitor during the charging phase is limited, a corresponding amount of charge that is discharged during the discharging phase is also constrained. By controlling the amount of output charge for a given switching frequency of the charge pump, the amount of output current is accurately limited. Controlling an amount of output current delivered by the charge pump to a load provides a number of advantages, such as maintaining the load within operating parameters and/or constraints.

In one aspect, a charge pump with accurate output current limiting is provided. The charge pump includes a switched capacitor and a plurality of switches configured to control connectivity of the switched capacitor. The plurality of switches are operable in two or more phases including a charging phase in which the switched capacitor is charged by a charging current and a discharging phase in which the switched capacitor is coupled to an output terminal. The charge pump further includes an output current limiting circuit configured to control the charging current to limit an amount of output current to the output terminal. The output current limiting circuit is configured to generate an integration signal based on integrating an observation current that changes in relation to the charging current, and to control the charging current based on comparing the integration signal to a reference signal.

In another aspect, a method of accurately limiting an output current of a charge pump is provided. The method includes providing a charging current to a switched capacitor in a charging phase of the charge pump, connecting the switched capacitor to an output terminal in a discharging phase of the charge pump, and controlling the charging current to limit an amount of output current to the output terminal, including integrating an observation current that changes in relation to the charging current, comparing the integrated observation current to a reference signal, and controlling the charging current based on the comparison.

In another aspect, a current source with accurate current limiting is provided. The current source includes a current mirror configured to receive a reference current and to generate a charging current and an observation current, the observation current changing in relation to the charging current. The current source further includes a current limiting circuit configured to generate an integration signal based on integrating the observation current, and to control the reference current based on comparing the integration signal to a reference signal.

BRIEF DESCRIPTION OF THE DRAWINGS

FIG. 2A is a schematic diagram of an inverting charge pump operating in a charging phase according to one embodiment.

FIG. 2B is a schematic diagram of the inverting charge pump of FIG. 2A operating in a discharging phase.

FIG. 5B is an expanded view of a portion of the graph of FIG. 5A.

DETAILED DESCRIPTION OF EMBODIMENTS

Figure 1:
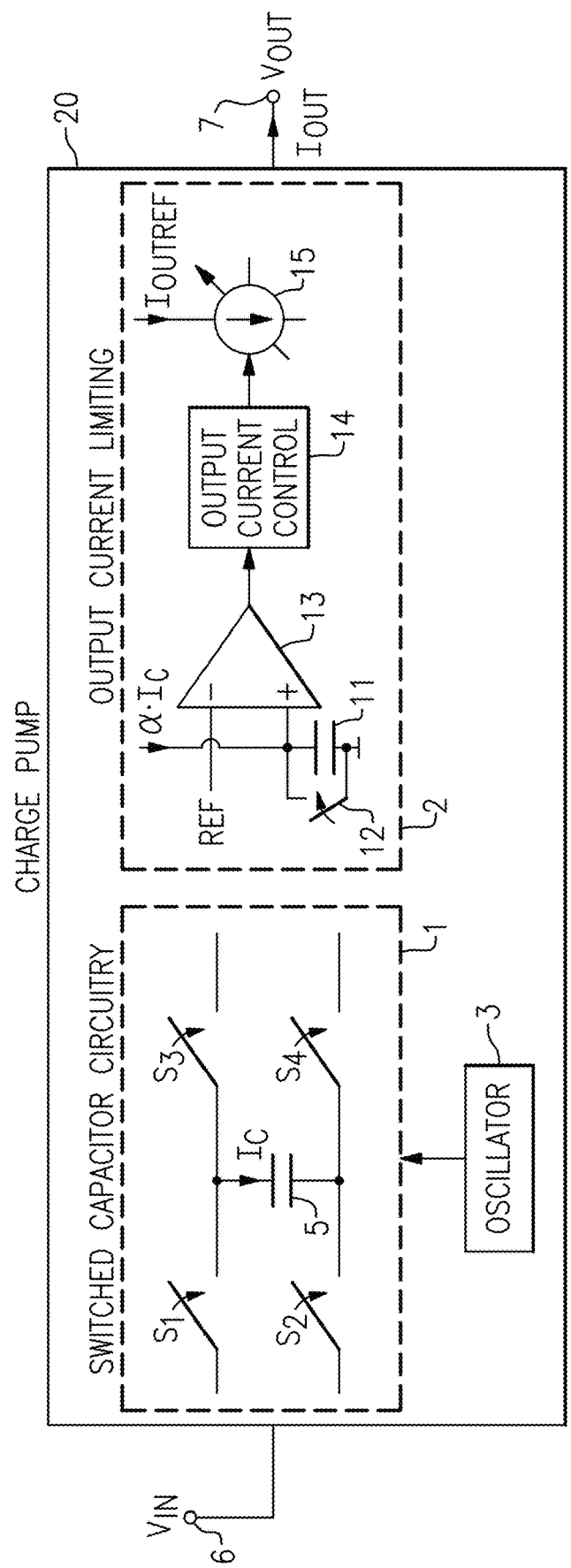
FIG. 1 is a schematic diagram of one embodiment of a charge pump.

The following detailed description of embodiments presents various descriptions of specific embodiments of the invention. However, the invention can be embodied in a multitude of different ways. In this description, reference is made to the drawings where like reference numerals may indicate identical or functionally similar elements. It will be understood that elements illustrated in the figures are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

A charge pump is a type of switching regulator used to generate a regulated output voltage based on an input voltage, such as a supply voltage. In certain implementations, a charge pump includes a flying capacitor that is charged or discharged by switches over various phases of the charge pump. For instance, the charge pump can be operated in a charging phase in which the flying capacitor is charged to a desired voltage, and a discharging phase in which the charge of the flying capacitor is transferred to the charge pump's output terminal. Examples of charge pumps include, but are not limited to, step-down charge pumps, step-up charge pumps, and inverting charge pumps. A flying capacitor is also referred to herein as a switched capacitor.

In certain applications, it can be desirable to have an accurate current limit from a charge pump. For example, it can be desirable to control an amount of current delivered by the charge pump to a load to thereby maintain the load within operating parameters and/or constraints.

However, a number of challenges inhibit accurately controlling a charge pump's output current. For example, it can be difficult to implement an accurate switched current source for high performance applications. For instance, current mirrors of known current can be selectively switched on or off at low frequencies to achieved a target current. Unfortunately, operating a charge pump at low frequency leads to relatively large value capacitors to prevent the charge pump's output impedance from being unduly compromised. However, large value capacitors increase the size and/or cost of the charge pump. Although switching at higher frequency allows the use of smaller capacitors, operating the charge pump at high frequencies degrades an ability to accurately limit the charge pump's output current.

The challenges in accurately limiting a charge pump's output current can be exacerbated by output current variation over processing and/or operating conditions. For instance, a number of factors can impact the amount of charge delivered per cycle of the charge pump that will compromise the accuracy of the current limit. Examples of such factors include, but are not limited to, switch non-overlap time, current source drift, gain drift, and/or changes in a current pulse waveform. Moreover, the impact of such factors on current limit accuracy can worsen with increase in switching frequency.

Charge pumps with accurate output current limiting are provided herein. In certain embodiments, a charge pump includes an output terminal for providing a regulated output voltage, a switched capacitor, and switches that control connectivity of the switched capacitor to thereby control charging and discharging operations of the switched capacitor. The switches are operable in two or more phases including a charging phase in which the switched capacitor is charged with a charging current and a discharging phase in which the switched capacitor is coupled to the output terminal. The charge pump further includes an output current limiting circuit that limits an amount of output current delivered by the charge pump to the output terminal. The output current limiting circuit generates an integration signal based on integrating an observation current that changes in relation to the charging current, and limits the amount of output current of the charge pump based on comparing the integration signal to a reference signal.

In certain implementations, the output current limiting circuit includes an integration capacitor that integrates the observation current to generate an integration voltage, and a comparator that compares the integrated voltage to a reference voltage. Additionally, the output of the comparator is processed using an output current control circuit that provides adjustment to a reference current used for controlling the level of the charging current during the charging phase.

In one example, the output current control circuit includes a digital circuit, such as a counter that increments or decrements the reference current used for charging on a given cycle based on whether or not the comparator determined that the integrated voltage was greater than or less than the reference voltage. In another example, the output current control circuit includes an analog circuit having an analog voltage used to control the reference current and that is regularly updated (for instance, each cycle) based on the comparison. For instance, such an analog control method can be similar in operation to how some phase-locked loops (PLLs) work.

By limiting the amount of current used for charging the switched capacitor during the charging phase, the amount of current delivered to the output terminal during the discharging phase of the charge pump is also limited. For instance, when the charge provided to the switched capacitor during the charging phase is limited, a corresponding amount of charge that is discharged during the discharging phase is also constrained. By controlling the amount of output charge for a given switching frequency of the charge pump, the amount of output current can be accurately limited.

In certain implementations, the switches used to control the connectivity of the switched capacitor include at least one current mirror having a reference current controlled by the output current limiting circuit. For example, a current mirror can be turned on or off to operate as a switched pulsed current source. Additionally, the current mirror can receive the reference current as an input, and provide the charging current and the observation current as outputs. In certain implementations, the current mirror is scaled such that the observation current is a fraction of the charging current (for instance, one-tenth or less) delivered to the switched capacitor during the charging phase.

In certain implementations, the integration capacitor is controllable to provide flexibility in controlling the output current limit of the charge pump. For instance, the integration capacitor can be implemented using an array of capacitor elements that are selectable to control an overall capacitance of the integration capacitor.

Thus, an accurate accounting of the charge delivered per cycle can be provided based on the amount of capacitance of the integration capacitor and the voltage across the integration capacitor at the end of the charging cycle. By integrating the charge in this manner, total charge can be limited regardless of what the actual current pulse waveform looks like. Thus, the output current limit can be accurately controlled and remain relatively constant across operating variations.

FIG. 1 is a schematic diagram of one embodiment of a charge pump 20. The charge pump 20 includes switched capacitor circuitry 1, an output current limiting circuit 2, and an oscillator 3. As shown in FIG. 1, the charge pump 20 receives an input voltage $V_{IN}$ at an input terminal 6 and outputs a regulated output voltage $V_{OUT}$ at an output terminal 7.

Although one embodiment of a charge pump with output current limiting is depicted, the teachings herein are applicable to charge pumps implemented in a wide variety of ways. Accordingly, other implementations are possible.

In the illustrated embodiment, the switched capacitor circuitry 1 includes a first switch $S_1$, a second switch $S_2$, a third switch $S_3$, a fourth switch $S_4$, and a switched capacitor 5 (also referred to herein as a flying capacitor). The switches $S_1$-$S_4$ are selectively opened or closed based on timing of one or more clock signals from the oscillator 3, thereby operating the charge pump 20 in various phases or cycles. The circuit phases or cycles include a charging phase in which the switched capacitor 5 is charged by a charging current $I_C$ and a discharging phase in which the switched capacitor 5 is coupled to the output terminal 7 to deliver an output current $I_{OUT}$.

Although an example with four switches and one switched capacitor is shown, a charge pump can include more or fewer switches and/or additional switched capacitors. For example, the number and/or connectivity of switches can be implemented for a desired application, such as desired output voltage. Although an example with one charge pump stage is shown, the teachings herein are also applicable to charge pumps including two or more stages.

In the illustrated embodiment, the output current limiting circuit 2 includes a integration capacitor 11, a reset switch 12, a comparator 13, an output current control circuit 14, and a controllable current source 15. Although one embodiment of an output current limiting circuit is shown, the teachings herein are applicable to output current control circuits implemented in a wide variety of ways.

As shown in FIG. 1, the integration capacitor 11 integrates an observation current, which corresponds to $\alpha*I_C$, in this example. The parameter a can be any suitable value, including, but not limited to, less than 1. Although an example in which the observation current changes substantially linearly to the charging current $I_C$ is shown, other implementations are possible. For example, any observation current that changes in relation to the charging current $I_C$ can be used. In another implementation, the observation current corresponds to sampled values of the charging current $I_C$ that are accumulated to generate an integration signal used for comparison.

With continuing reference to FIG. 1, the comparator 13 compares an integrated voltage across the integration capacitor 11 to a reference signal REF. The reset switch 12 operates to reset the integration voltage, for instance, during the discharging phase. The output of the comparator 13 is provided to the output current control circuit 14, which provides adjustment to the controllable current source 15 based on the output of the comparator 13.

As shown in FIG. 1, the controllable current source 15 generates a reference current $I_{OUTREF}$, which is used to limit an amount of output current $I_{OUT}$ provided to the output terminal 7.

In certain implementations, the reference current $I_{OUTREF}$ serves to control the value of the charging current $I_C$ during the charging phase. Additionally or alternatively the reference current $I_{OUTREF}$ serves to control the value of the charging current $I_C$ during the discharging phase. Limiting the amount of charge provided to the switched capacitor 5 during the charging phase and/or discharging phase also limits the amount of charge provided to the output terminal 7 during the discharging phase. Since current corresponds to charge delivered over time, controlling the amount of output charge for a given frequency of the oscillator 3 also limits the output current $I_{OUT}$.

In certain implementation, the reference current $I_{OUTREF}$ is provided as an input to a current mirror that generates the charging current $I_C$. Thus, the value of the charging current $I_C$ used during the charging phase can be adapted over time by the output current limiting circuit 2 to thereby provide an output current limit. In the illustrated embodiment, the output current limit can be controlled in a wide variety of ways, such as controlling a value of the integration capacitor 11, controlling a value of the reference signal REF, controlling a value of $\alpha$, and/or controlling an offset of the comparator 13. Although various examples of control of the output current limit have been provided, other implementations are possible.

FIGS. 2A and 2B are schematic diagrams of an inverting charge pump 30 according to one embodiment. FIG. 2A depicts the inverting charge pump 30 operating in a charging phase, and FIG. 2B depicts the inverting charge pump 30 operating in a discharging phase.

In the illustrated embodiment, the inverting charge pump 30 includes a current mirror 21 that operates as a first switch $S_1$. The inverting charge pump 30 further includes a second switch $S_2$, a third switch $S_3$, a fourth switch $S_4$, a switched capacitor 5, an integration capacitor 11, a reset switch 12, a comparator 13, an output current control circuit 14, and a controllable current source 15. Although not shown in FIGS. 2A and 2B, any suitable control circuit, such as an oscillator, can be used to open and close the switches and/or to provide other control functionality.

The charge pump 30 generates the output voltage $V_{OUT}$ to be inverted with respect to ground. Although one embodiment of an inverting charge pump is shown, the teachings herein are applicable to inverting charge pumps implemented in a wide variety of ways. Moreover, the teachings herein are applicable not only to inverting charge pumps, but also to other types of charge pumps, such as step-up charge pumps or step-down charge pumps. Accordingly, other implementations are possible.

As shown in FIG. 2A, during the charging phase, third switch $S_3$, the fourth switch $S_4$, and the reset switch 12 are opened, while the second switch $S_2$ is closed (connected to ground, in this example). Additionally, a switch enable signal $S_1EN$ provided to an enable input (EN) of the current mirror 21 is activated such that the charging current $I_C$ charges the switched capacitor 5. Additionally, an observation current (corresponding to $\alpha*I_C$, in this example) charges the integration capacitor 11.

In this embodiment, the current mirror 21 receives the reference current $I_{OUTREF}$ from the controllable current source 15 at an input (IN), and provides the charging current $I_C$ at a first output (OUT1) and the observation current $\alpha*I_C$ at a second output (OUT2). Thus, the value of the charging current $I_C$ for a given charging cycle is based on the value of the reference current $I_{OUTREF}$ for that cycle. The current mirror 61 also receives the input voltage $V_{IN}$, in this example.

With continuing reference to FIG. 2A, the comparator 13 compares the integrated voltage across the integration capacitor 11 to the reference signal REF. Additionally, the output current control circuit 14 processes the output of the comparator 13 to control the amount of reference current $I_{OUTREF}$ provided by the controllable current source 15. In certain implementations, the reference current $I_{OUTREF}$ is substantially constant for a given charging cycle, but is adjusted by the output current control circuit 14 at the end of the charging phase such that the value of the reference current $I_{OUTREF}$ is selectively adjustable for each charging phase. Thus, the reference current $I_{OUTREF}$ adapts or changes over time.

As shown in FIG. 2B, during the discharging phase, the second switch $S_2$ is opened, while the third switch $S_3$ and the fourth switch $S_4$ are closed. Additionally, the current mirror $S_1$ is deactivated, and the reset switch 12 is closed to reset the integration voltage.

In the illustrated embodiment, the reference current $I_{OUTREF}$ is controlled by the output current control circuit 14, and thus the amount of charge provided to the switched capacitor 5 is constrained. The constraint on the amount of charge provided to the switched capacitor 5 also limits the amount of charge provided to the output terminal during the discharging phase. Since current corresponds to charge delivered over time, controlling the amount of output charge for a given switching frequency of the charge pump 30 also limits the output current $I_{OUT}$.

Figure 3:
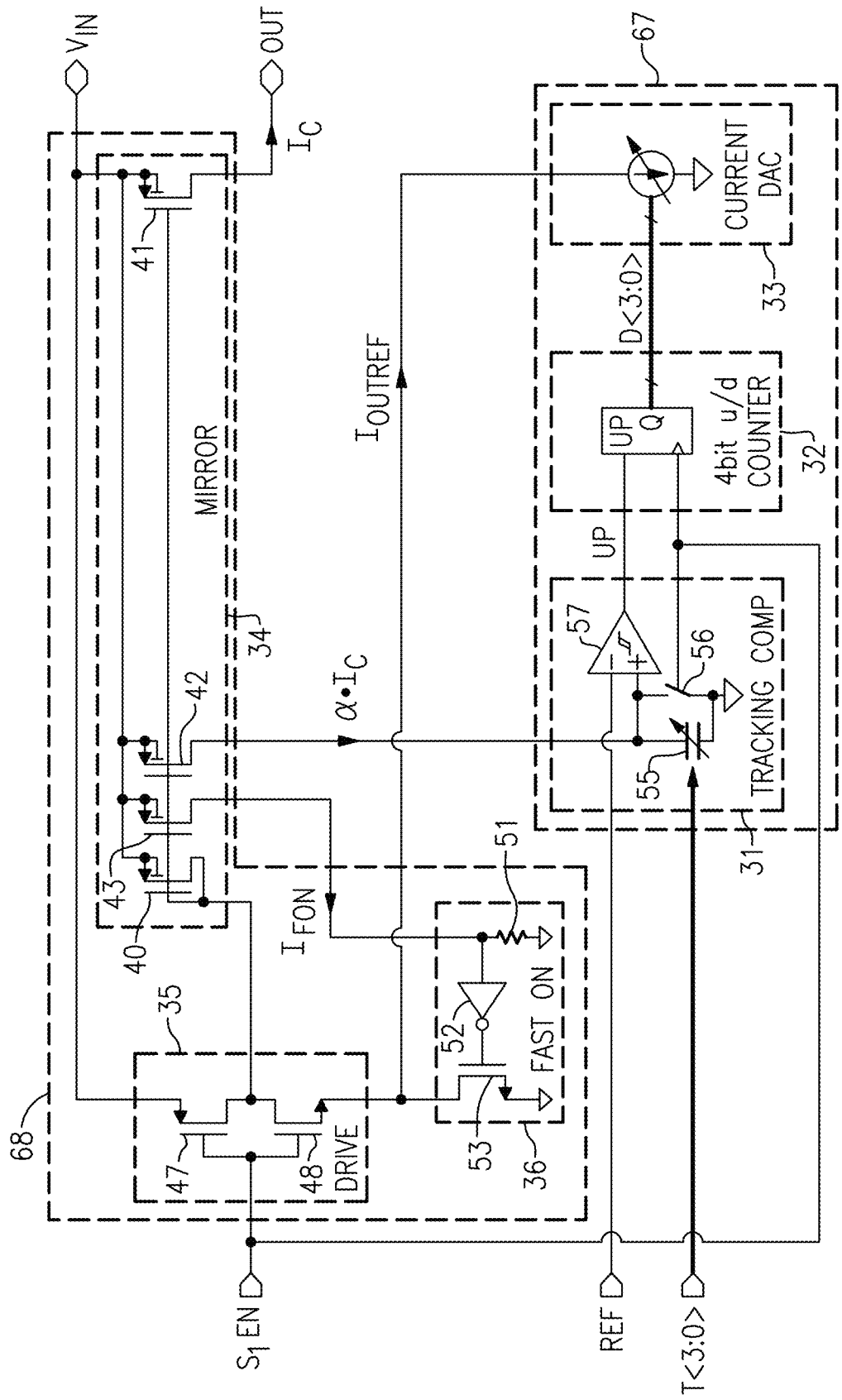
FIG. 3 is a schematic diagram of an output current limiting circuit and a switch according to another embodiment.

FIG. 3 is a schematic diagram of an output current limiting circuit 67 and a switch 68 according to another embodiment. As shown in FIG. 3, the output current limiting circuit 67 includes tracking comparator circuitry 31, a counter 32, and a current digital-to-analog converter (DAC) 33. Additionally, the switch 68 includes mirror transistors 34 serving as a current mirror, a mirror enable circuit 35, and a mirror transient boosting or fast on circuit 36.

As shown in FIG. 3, the tracking comparator circuitry 31 includes a digitally-controllable integration capacitor 55 (controlled using four trimming bits, T<3:0>, in this example), a reset switch 56, and a hysteretic comparator 57 that compares the voltage across the digitally-controllable integration capacitor 55 to a reference signal REF. Additionally, the counter 32 corresponds to an up/down counter that generates a counter signal D<3:0> (four bits, in this example). The counter signal D<3:0> is provided to an input of the current DAC 33 to control the amount of reference current $I_{OUTREF}$ provided by the current DAC 33 to the switch 68.

Although an example with a counter is shown, the teachings herein are applicable to other configurations of output current control circuits, including implementations with analog and/or digital circuitry. For example, in another embodiment, an output current control circuit includes an analog circuit, similar to a phase-locked loop, having an analog voltage used to control the reference current and that is regularly updated (for instance, each cycle) based on the output of the comparator.

In the illustrated embodiment, the mirror transistors 34 each include a source that receives an input voltage $V_{IN}$. As shown in FIG. 3, the mirror transistors 34 include an input transistor 40 for receiving an input current to the mirror. Additionally, the mirror transistors 34 further include a first output transistor 41 for generating a charging current $I_C$ for a switched capacitor connected to an output terminal OUT, a second output transistor 42 for generating an observation current (corresponding to $\alpha * I_C$, in this example), and a third output transistor 43 for generating a fast on current $I_{FON}$ for the fast on circuit 36.

The relative sizing (for instance, ratios of transistor widths) of the mirror transistors 34 can be selected to achieve desired ratios of the output currents relative to the input current to the mirror. Such ratios can be greater than one, equal to one, and/or less than one. For instance, in one example, the first output transistor 41 is selected to about 150 times the size of the input transistor 40, while the second output transistor 42 and the third output transistor 43 are selected to be about one-tenth the size of the input transistor 40. Although one example of transistor sizing ratios have been provided, other implementations are possible.

In the illustrated embodiment, the mirror enable circuit 35 includes a p-type field effect transistor (PFET) 47 and an n-type field effect transistor (NFET) 48 that receives a switch enable signal $S_1EN$ for selectively providing an input current to the mirror transistors 34.

With continuing reference to FIG. 3, the fast on circuit 36 includes a current detection resistor 51, an inverter 52, and a fast on transistor 53. The fast on circuit 36 pulls down harder on the gates of the mirror transistors 34 until current starts flowing in the mirror (as indicated by the fast on current $I_{FON}$). The extra drive provided by the fast on circuit 36 is thereafter shut off and the reference current $I_{OUTREF}$ is multiplied by the mirror gain to the output terminal OUT.

Thus, after the switch 68 is enabled, the fast on transistor 53 serves to pull down the gates of the mirror transistors 34 to quickly turn on the mirror transistors 34. However, once the fast on current $I_{FON}$ is sufficiently high (for instance, when the resistance of the resistor 51 multiplied by the fast on current $I_{FON}$ is greater than a trigger voltage of the inverter 52), the fast on circuit 36 is deactivated and the reference current $I_{OUTREF}$ serves as the input current to the current mirror. Thus, in the steady-state the reference current $I_{OUTREF}$ serves to control the value of the charging current $I_C$.

By including the fast on circuit 36, the time to turn on the mirror transistors 34 is reduced thereby allowing the mirror transistors 34 to deliver current to the flying capacitor for a greater proportion of the charging cycle. For high efficiency, it is desirable to have a high mirror gain (for instance, 100 or more). Absent compensation, high mirror gain results in long turn on times of the mirror since the gate capacitance is large with respect to the reference current $I_{OUTREF}$. By including the fast on circuit 36, transient performance is boosted.

Figure 4:
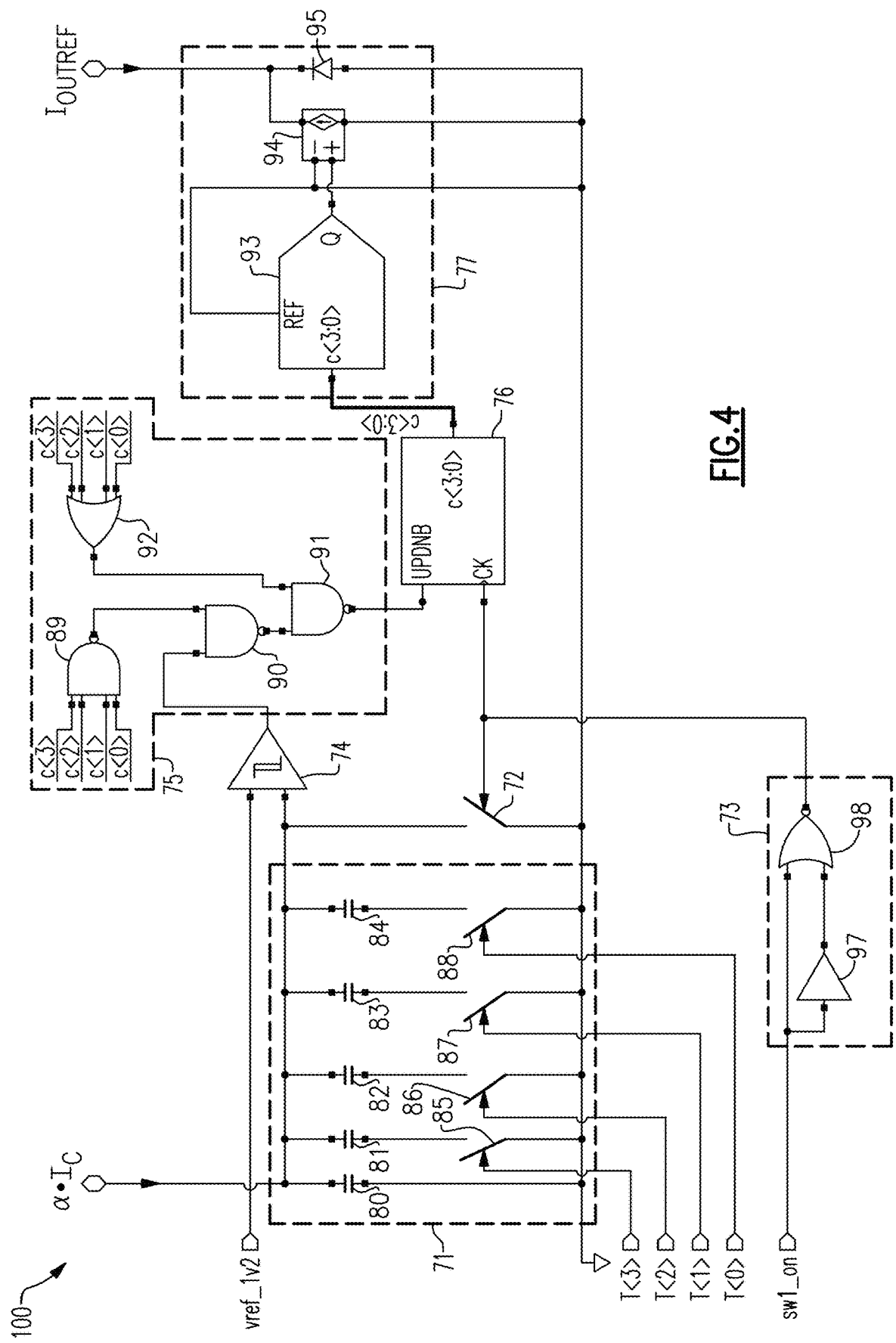
FIG. 4 is a schematic diagram of an output current limiting circuit according to another embodiment.

FIG. 4 is a schematic diagram of an output current limiting circuit 100 according to another embodiment. The output current limiting circuit 100 includes a reference capacitor 71, a reset switch 72, timing pulse generation circuitry 73, a hysteretic comparator 74, comparator processing logic circuitry 75, an up/down counter 76, and current DAC circuitry 77.

In the illustrated embodiment, the reference capacitor 71 includes a fixed capacitor 80, a first trimming capacitor 81 that is selectable by a first switch 85, a second trimming capacitor 82 that is selectable by a second switch 86, a third trimming capacitor 83 that is selectable by a third switch 87, and a fourth trimming capacitor 84 that is selectable by a fourth switch 88. As shown in FIG. 4, the switches 85-88 are controlled by trimming bits T<3>, T<2>, T<1>, and T<0>, respectively. The reference capacitor 71 receives an observation current (corresponding to $\alpha * I_C$, in this example), which the reference capacitor 71 integrates to generate an integration voltage.

The hysteretic comparator 74 compares the integrated voltage on the integration capacitor 71 to a reference voltage vref_1v2 (about 1.2 V, in this example) at the end of the charging cycle. The output of the hysteretic comparator 74 is processed by the comparator processing logic circuitry 75 to either increase or decrease the value of the up/down counter 76, thereby controlling the current delivered by the current DAC circuitry 77 per cycle based on the integration voltage either being above or below the reference voltage. The comparator processing logic circuitry 75 includes a first NAND gate 89, a second NAND gate 90, a third NAND gate 91, and an OR gate 92, in this example.

As shown in FIG. 4, the 4-bit up/down counter 76 drives the current output DAC circuitry 77 that sets the desired output reference current $I_{OUTREF}$. In the illustrated embodiment, the 4-bit up/down counter 76 outputs count bits c<3>, c<2>, c<1>, and c<0>, collectively referred to as c<3:0>. Adding more capacitance to the integration capacitor 71 through the trim bits (T<3:0>) causes more current to be delivered per cycle. At steady state the tracking converter will step back and forth one bit around the desired current limit, in this embodiment.

In certain implementations, the counter 76 is implemented to not wrap around. For example, in an implementation using four bits, the counter 76 can be implemented to saturate at a positive full scale (for instance, 1111) and at a negative full scale (for instance, 0000) such that the count saturates rather than wraps.

The timing pulse generation circuitry 73 receives the switch on signal sw1_on, and can be used to delay sampling the comparator result and discharge of the integration capacitor 71 to compensate for comparator propagation delay. In the illustrated embodiment, the timing pulse generation circuitry 73 includes a buffer 97 and a NOR gate 98 for controlling the delay (for instance, 50 ns or other desired time delay).

In the illustrated embodiment, the current output DAC circuitry 77 includes a current DAC 93, a controllable current source 94, and a diode 95. The current DAC 93 includes a multi-bit data input for receiving c<3:0>, a reference input (REF) for receiving ground, and an output (Q) for controlling the controllable current source 94. The diode 95 is electrically connected in parallel with the controllable current source 94, and serves to limit the voltage across the controllable current source 94.

Figure 5A:
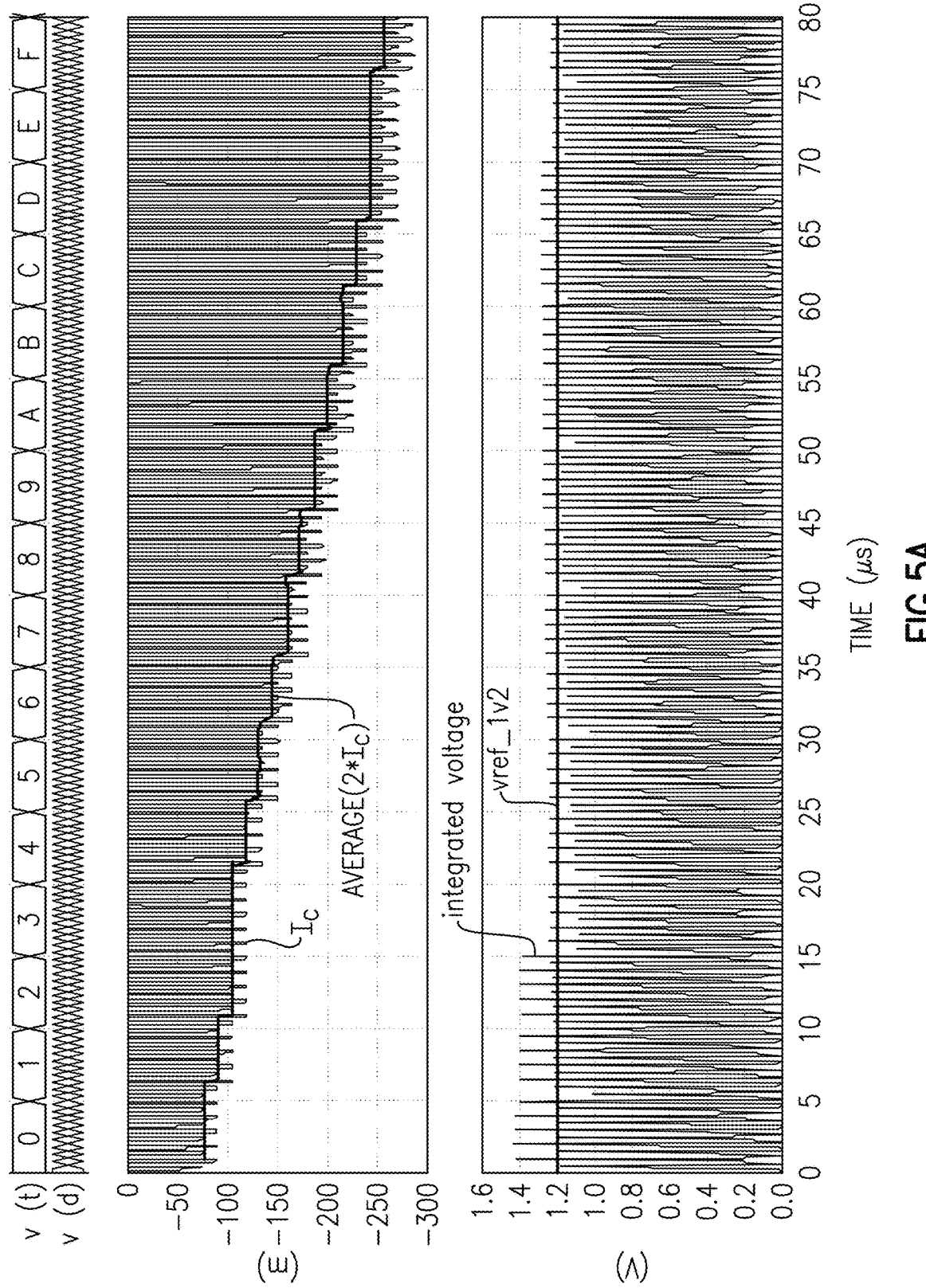
FIG. 5A is a graph of one example of simulation results for a charge pump.

FIG. 5A is a graph of one example of simulation results for a charge pump. FIG. 5B is an expanded view of a portion of the graph of FIG. 5A between 35 μs and 45 μs. The graphs of FIGS. 5A and 5B correspond to results of a transient simulation of one implementation of a charge pump using the output current limiting circuit 100 of FIG. 4. The simulation adjusts the current limit trim bits (T<3:0>) over time with bit values of the trim bits indicated at the top of the graphs using hexadecimal notation.

In this simulation, the current source pulse provided to the output terminal of the charge pump has a resistor-capacitor (RC) type rise and fall. However, in other implementations, a square response is used. By stepping up the trim code (T<3:0>) of the integration capacitor 71, the current delivered per cycle steps up about 14 mA for each bit of trim and has a range of about 70 mA to 270 mA, in this example. Once trimmed the absolute current limit has little to no drift, for instance, drift that is limited to capacitor drift, reference drift, mirror matching drift, and/or oscillator period drift. Such drifts can be relatively small and/or compensated to reduce or eliminate variation. Other drifts components such as non-overlap time, shifts in $I_{OUTREF}$, and pulse waveform are removed by the tracking function.

Although various examples of performance results have been shown, simulation or measurement results can vary based on a wide variety of factors, such as simulation models, simulation tools, simulation parameters, measurement conditions, fabrication technology, and/or implementation details. Accordingly, other results are possible.

Figure 6A:
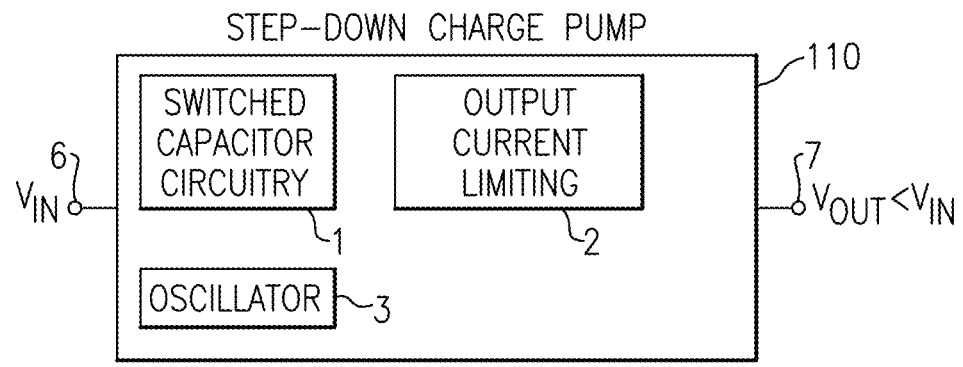
FIG. 6A is a schematic diagram of another embodiment of a charge pump.

FIG. 6A is a schematic diagram of another embodiment of a charge pump 110. The charge pump 110 includes switched capacitor circuitry 1, an output current limiting circuit 2, and an oscillator 3. The charge pump 110 receives an input voltage $V_{IN}$ at an input terminal 6 and provides an output voltage $V_{OUT}$ at an output terminal 7. The charge pump 110 is implemented as a step-down charge pump such that the output voltage $V_{OUT}$ is less than the input voltage $V_{IN}$.

The charge pump 110 can be implemented in accordance with any of the embodiments herein.

Figure 6B:
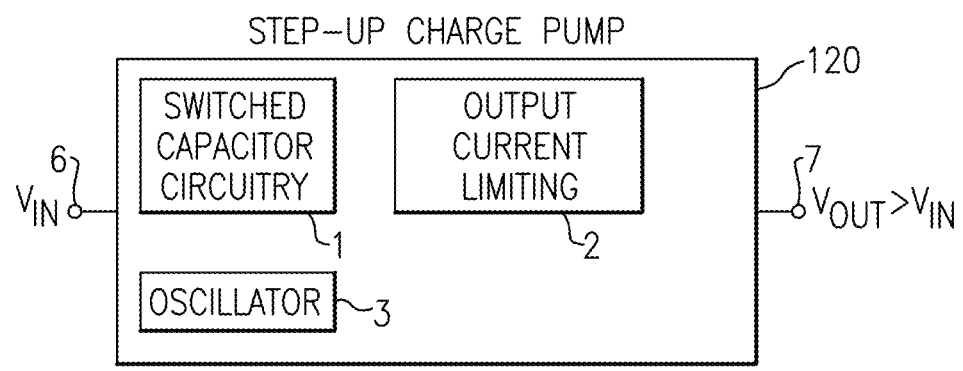
FIG. 6B is a schematic diagram of another embodiment of a charge pump.

FIG. 6B is a schematic diagram of another embodiment of a charge pump 120. The charge pump 120 includes switched capacitor circuitry 1, an output current limiting circuit 2, and an oscillator 3. The charge pump 120 receives an input voltage $V_{IN}$ at an input terminal 6 and provides an output voltage $V_{OUT}$ at an output terminal 7. The charge pump 120 is implemented as a step-up charge pump such that the output voltage $V_{OUT}$ is greater than the input voltage $V_{IN}$.

The charge pump 120 can be implemented in accordance with any of the embodiments herein.

Figure 7:
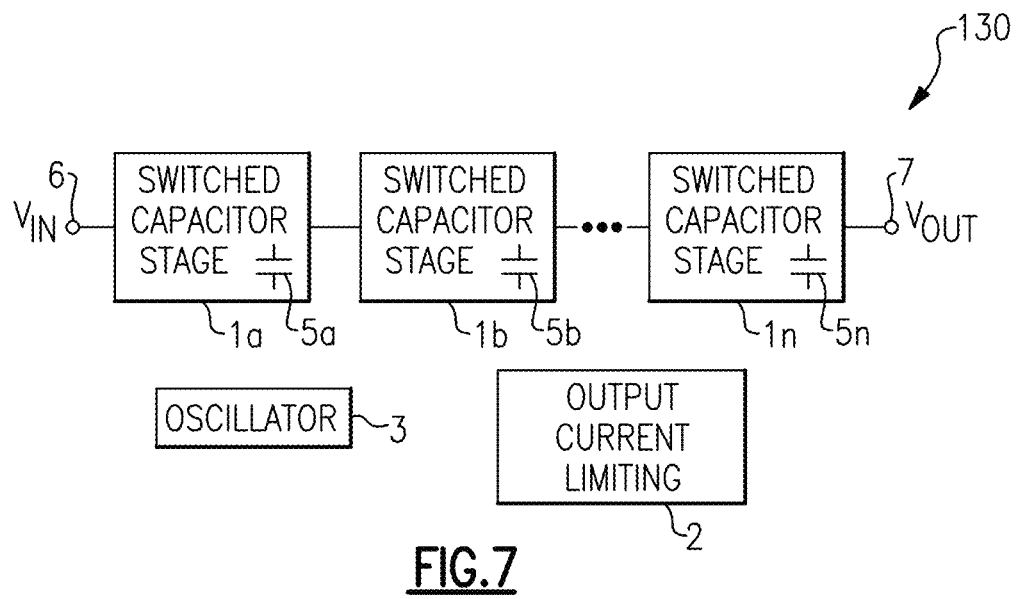
FIG. 7 is a schematic diagram of another embodiment of a charge pump.

FIG. 7 is a schematic diagram of another embodiment of a charge pump 130. The charge pump 130 includes switched capacitor circuitry including switched capacitor stages 1a, 1b, . . . 1n including switched capacitors 5a, 5b, . . . 5n. The charge pump 130 further includes an output current limiting circuit 2 and an oscillator 3. The charge pump 130 receives an input voltage $V_{IN}$ at an input terminal 6 and provides an output voltage $V_{OUT}$ at an output terminal 7.

The charge pump 130 is implemented as a multi-stage charge pump in which two or more switches capacitor stages are cascaded to increase the value of the step-up or step-down voltage. Any of the embodiments herein can be implemented with two or more stages.

Applications

Devices employing the above described schemes can be implemented into various electronic devices. Examples of electronic devices include, but are not limited to, RF communication systems, consumer electronic products, electronic test equipment, communication infrastructure, etc.

CONCLUSION

The foregoing description may refer to elements or features as being "connected" or "coupled" together. As used herein, unless expressly stated otherwise, "connected" means that one element/feature is directly or indirectly connected to another element/feature, and not necessarily mechanically. Likewise, unless expressly stated otherwise, "coupled" means that one element/feature is directly or indirectly coupled to another element/feature, and not necessarily mechanically. Thus, although the various schematics shown in the figures depict example arrangements of elements and components, additional intervening elements, devices, features, or components may be present in an actual embodiment (assuming that the functionality of the depicted circuits is not adversely affected).

While certain embodiments have been described, these embodiments have been presented by way of example only, and are not intended to limit the scope of the disclosure. Indeed, the novel apparatus, methods, and systems described herein may be embodied in a variety of other forms; furthermore, various omissions, substitutions and changes in the form of the methods and systems described herein may be made without departing from the spirit of the disclosure. For example, while the disclosed embodiments are presented in a given arrangement, alternative embodiments may perform similar functionalities with different components and/or circuit topologies, and some elements may be deleted, moved, added, subdivided, combined, and/or modified. Each of these elements may be implemented in a variety of different ways. Any suitable combination of the elements and acts of the various embodiments described above can be combined to provide further embodiments. Accordingly, the scope of the present invention is defined only by reference to the appended claims.

Although the claims presented here are in single dependency format for filing at the USPTO, it is to be understood that any claim may depend on any preceding claim of the same type except when that is clearly not technically feasible.

What is claimed is:

1. A charge pump with accurate output current limiting, the charge pump comprising:
   a switched capacitor;
   a plurality of switches configured to control connectivity of the switched capacitor, wherein the plurality of switches are operable in two or more phases including a charging phase in which the switched capacitor is charged by a first charging current and a discharging phase in which the switched capacitor is coupled to an output terminal to provide an output current; and
   an output current limiting circuit configured to control the first charging current to limit an amount of the output current to the output terminal during the discharging phase, the output current limiting circuit configured to generate a second charging current that changes in relation to the first charging current during the charging phase, to integrate the second charging current to generate an integration signal, and to control the first charging current based on comparing the integration signal to a reference signal, wherein both the first charging current and the second charging current are generated in the charging phase, wherein the output current limiting circuit further comprises a controllable current source configured to generate a reference current for controlling charging of the switched capacitor in the charging phase, and wherein at least one of the plurality of switches includes a current mirror configured to receive the reference current as an input.

2. The charge pump of claim 1, wherein the output current limiting circuit comprises an integration capacitor configured to integrate the second charging current, and a comparator configured to compare an integration voltage across the integration capacitor to a reference voltage.

3. The charge pump of claim 2, wherein the output current limiting circuit further comprises an output current control circuit configured to control the reference current based on an output of the comparator.

4. The charge pump of claim 3, wherein the output current control circuit includes a counter having a value incremented or decremented based on the output of the comparator.

5. The charge pump of claim 4, wherein the counter is non-wrapping.

6. The charge pump of claim 2, wherein the output current limiting circuit further comprises a reset switch configured to reset the integration voltage in the discharging phase.

7. The charge pump of claim 1, further including a fast on circuit configured to enhance a gate voltage of the current mirror quickly, wherein the fast on circuit is configured to deactivate in response to a current through the current mirror reaching a threshold level.

8. The charge pump of claim 1, wherein the second charging current corresponds to a fraction of the first charging current.

9. A charge pump with accurate output current limiting, the charge pump comprising:
   a switched capacitor;
   a plurality of switches configured to control connectivity of the switched capacitor, wherein the plurality of switches are operable in two or more phases including a charging phase in which the switched capacitor is charged by a charging current and a discharging phase in which the switched capacitor is coupled to an output terminal; and
   an output current limiting circuit configured to control the charging current to limit an amount of output current to the output terminal, the output current limiting circuit configured to generate an integration signal based on integrating an observation current that changes in relation to the charging current, and to control the charging current based on comparing the integration signal to a reference signal, the output current limiting circuit comprising an integration capacitor configured to integrate the observation current, a comparator configured to compare an integration voltage across the integration capacitor to a reference voltage, a controllable current source configured to generate a reference current for controlling charging of the switched capacitor in the charging phase, and an output current control circuit configured to control the reference current based on an output of the comparator,
   wherein at least one of the plurality of switches includes a current mirror configured to receive the reference current as an input, and to generate the charging current at a first output and the observation current at a second output.

10. The charge pump of claim 9, wherein the current mirror is scaled such that the observation current corresponds to a fraction of the charging current.

11. A method of accurately limiting an output current of a charge pump, the method comprising:
    providing a first charging current to a switched capacitor in a charging phase of the charge pump;
    connecting the switched capacitor to an output terminal to provide an output current in a discharging phase of the charge pump;
    controlling the first charging current to limit an amount of the output current to the output terminal during the discharging phase, including generating a second charging current that changes in relation to the first charging current during the charging phase, integrating the second charging current, comparing the integrated second charging current to a reference signal, and controlling the first charging current based on the comparison, wherein both the first charging current and the second charging current are generated in the charging phase;
    controlling a reference current used for controlling charging of the switched capacitor in the charging phase based on an output of a comparator; and
    mirroring the reference current to generate the first charging current using a current mirror.

12. The method of claim 11, further comprising integrating the second charging current on an integration capacitor, and comparing an integration voltage across the integration capacitor to a reference voltage using the comparator.

13. The method of claim 12, further comprising enhancing a gate voltage of the current mirror using a fast on circuit in the charging phase, and deactivating the fast on circuit in response to a current through the current mirror reaching a threshold level.

14. The method of claim 12, further comprising resetting the integration voltage in the discharging phase.

15. A charge pump with accurate output current limiting, the charge pump comprising:
   a switched capacitor;
   a plurality of switches configured to control connectivity of the switched capacitor, wherein the plurality of switches are operable in two or more phases including a charging phase in which the switched capacitor is charged by a first charging current and a discharging phase in which the switched capacitor is coupled to an output terminal to provide an output current;
   an output current limiting circuit configured to control the first charging current to limit an amount of the output current to the output terminal during the discharging phase, the output current limiting circuit configured to generate a second charging current that changes in relation to the first charging current during the charging phase, to integrate the second charging current to generate an integration signal, and to control the first charging current based on comparing the integration signal to a reference signal; and
   a current mirror configured to provide the first charging current at a first output and the second charging current at a second output.

16. The charge pump of claim 15, wherein the second output is scaled relative to the first output.

17. The charge pump of claim 15, wherein the current mirror is configured to receive a reference current at an input, the reference current controlled by the output current limiting circuit.

18. The charge pump of claim 15, wherein the second charging current corresponds to a fraction of the first charging current.

19. The charge pump of claim 15, wherein the output current limiting circuit further comprises a comparator configured to compare the integration signal to the reference signal.

20. The charge pump of claim 15, wherein the output current limiting circuit further comprises a reset switch configured to reset the integration signal in the discharging phase.

* * * * *